(12) United States Patent
Satoh

(10) Patent No.: US 7,171,027 B2
(45) Date of Patent: Jan. 30, 2007

(54) VEHICULAR IMAGE PROCESSING APPARATUS AND RELATED METHOD

(75) Inventor: Hiroshi Satoh, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 750 days.

(21) Appl. No.: 10/365,526

(22) Filed: Feb. 13, 2003

(65) Prior Publication Data

US 2003/0169902 A1    Sep. 11, 2003

(30) Foreign Application Priority Data

Mar. 5, 2002    (JP)    ............ P 2002-058402

(51) Int. Cl.
*G06K 9/00*    (2006.01)
(52) U.S. Cl. ............... 382/104; 340/937; 348/739; 348/837
(58) Field of Classification Search ............... 382/104; 340/937, 901–904, 933, 935, 938; 701/3, 701/19–23, 29, 32, 36, 45, 49, 50, 53, 69, 701/72, 81, 89, 91, 93, 98, 124; 348/118, 348/120, 148, 837
See application file for complete search history.

(56) References Cited

U.S. PATENT DOCUMENTS 5,809,161 A * 9/1998 Auty et al. ............... 382/104
6,430,303 B1 * 8/2002 Naoi et al. ............... 382/104
6,502,031 B2 * 12/2002 Uehara ............... 701/207
6,535,242 B1 * 3/2003 Strumolo et al. ............ 348/148
6,636,257 B1 * 10/2003 Harada et al. ............ 348/148
6,828,903 B2 * 12/2004 Watanabe et al. ............ 340/435

FOREIGN PATENT DOCUMENTS

| JP | 11-150726 | 6/1999 |
| JP | P2000-253401 A | 9/2000 |
| JP | 2001-167282 A | 6/2001 |

* cited by examiner

*Primary Examiner*—Jingge Wu
*Assistant Examiner*—Abolfazi Tabatabai
(74) *Attorney, Agent, or Firm*—McDermott Will & Emery LLP

(57) ABSTRACT

A vehicular image processing apparatus and related method are disclosed as having a high speed camera 2 that picks up an image of a surrounding of a vehicle, a low speed image extracting unit 6 extracting an image calculated with a low speed area calculating unit 4, a high speed image extracting unit 5 extracting other image than that calculated with the low speed area calculating unit 4, and an image outputting unit 9 synthesizing image information extracted with the high image extracting unit 5 and image information related to the image of the low speed area to provide an output which is applied to an image recognition device 11 to detect an obstacle around the vehicle or a road shape. A frame rate adjusting unit 8 enables the output image of the low speed image extracting unit 6 to be applied to the image outputting unit 9.

9 Claims, 3 Drawing Sheets

VEHICULAR IMAGE PROCESSING APPARATUS AND RELATED METHOD

BACKGROUND OF THE INVENTION

The present invention relates to a vehicular image processing apparatus adapted to detect an obstacle of a surrounding of a vehicle or a shape of a road on which the vehicle travels.

An image processing apparatuses proposed in related art is disclosed in Japanese Patent Application Laid-Open No. 2000-253401.

Such an image processing apparatus, that is a device for transmitting digital image data in a full frame, alternately transmits line data in an odd number at one frame and line data in an even number at a subsequent frame, respectively, to allow the volume of transmitting data per unit time to be reduced in half of the volume in which image data in the full frame is transmitted, with an associated receiver being arranged to have a frame composed of line data in the odd number (the even number) and line data in the even number (the odd number) precedingly received to provide an image for thereby reducing the volume of data to be transmitted.

SUMMARY OF THE INVENTION

There is a need for the vehicular image processing apparatus, adapted to detect the obstacle around the surrounding of the vehicle or the shape of the road on which the vehicle travels, to provide a highly reliable detection results. Further, when controlling the movements of the vehicle on the basis of the detection results, a short updating cycle of the detection result is required to increase a controllability of the movements of the vehicle. To this end, while in a related art practice, an image to be updated at a video rate is picked up with an image pickup element to allow a desired information to be detected from such an image, there is a need for the vehicular image processing apparatus to increase the updating cycle of the image, i.e., the frame rate for the reason set forth above.

However, with the related art structure, since the images are alternately transmitted for each line, the image is caused to have a deteriorated quality, with a resultant decrease in a reliability in the detection result and, as a result, it becomes hard for the related art structure to be adapted to suit the vehicle.

Further, because of utilizing a high frequency signal, the image processing apparatus is apt to be adversely affected with noises, resulting in deterioration in the reliability of the apparatus.

It is therefore an object of the present invention to provide a vehicular image processing apparatus which provides an image in a high quality and a detection result in a high reliability.

To address the above issues, a first aspect of the present invention provides a vehicular image processing apparatus, comprising an image pickup unit picking up an image of at least a portion of a surrounding of a vehicle, a processing device detecting at least a portion of an object, to be detected around the surroundings of the vehicle, from image information picked up with the image pickup unit, an output unit outputting the image, picked up with the image pickup unit, to the processing device, and a dividing unit dividing an area of the image, picked up with the image pickup unit, into an area to be outputted at a high frame rate and an area to be outputted at a lower frame rate than that of the high frame rate.

According to a second aspect of the present invention, there is provided a method of processing an image for a vehicle, comprising picking up an image of at least a portion of a surrounding of a vehicle with an image pickup unit, detecting at least a portion of an object, to be detected around the surroundings of the vehicle, from image information picked up with the image pickup unit, outputting the image, picked up with the image pickup unit, to a processing device, and dividing an area of the image, picked up with the image pickup unit, into an area to be outputted at a high frame rate and an area to be outputted at a lower frame rate than that of the high frame rate.

DETAILED DESCRIPTION OF THE PREFERRED EMBODIMENTS

Figure 1:
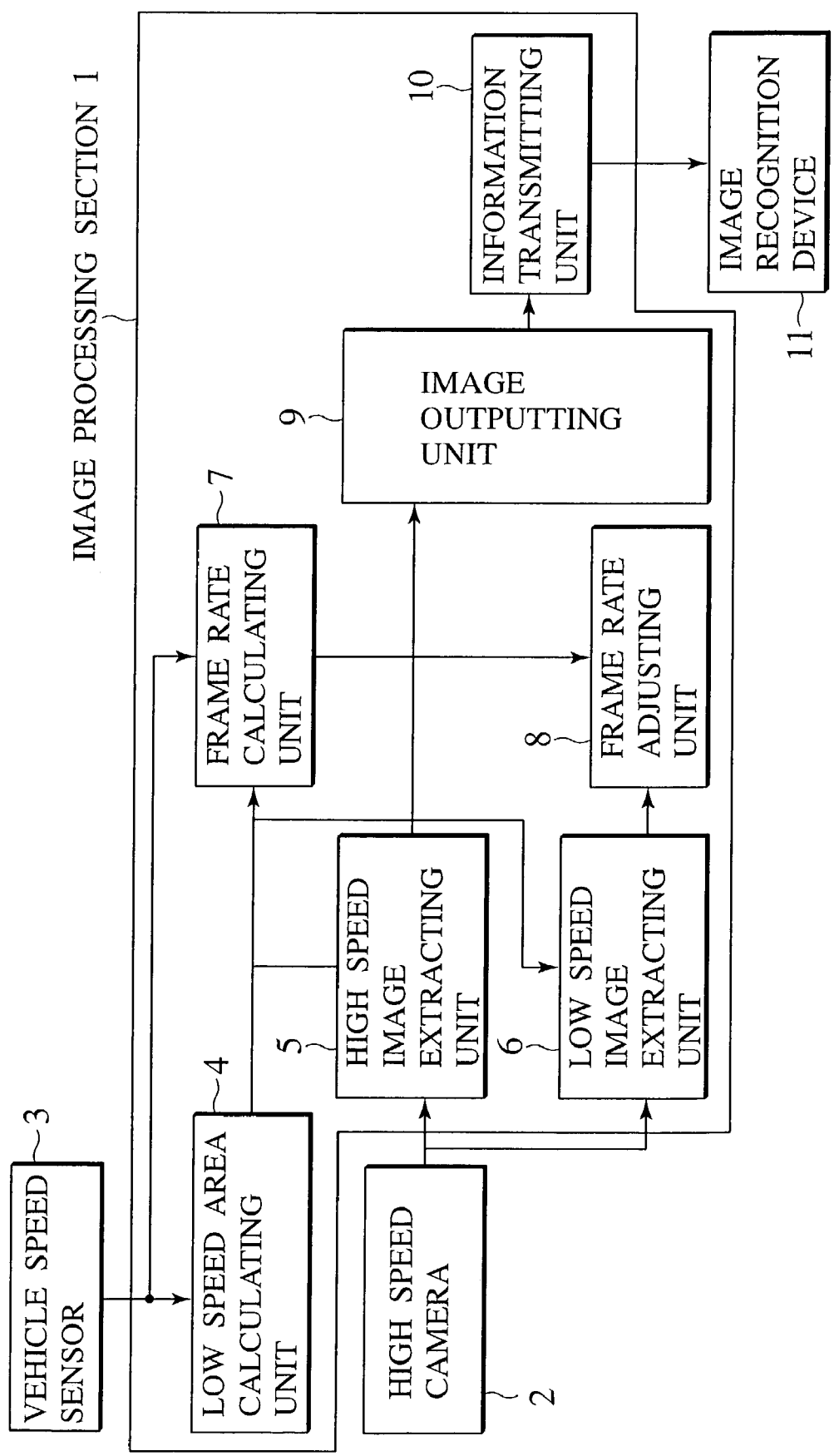
FIG. 1 is a block diagram illustrating a structure of a vehicular image processing apparatus of a first embodiment according to the present invention.

Reference is now made in detail to embodiments of the present invention which is illustrated in the accompanying drawings. In the following description of the embodiments with reference to the drawings, component parts having the same functions are given the same reference numerals and repetitive redundant descriptions of the same parts are omitted.

<First Embodiment>

FIG. 1 is a block diagram illustrating a vehicular image processing apparatus of a first embodiment according to the present invention.

The image processing apparatus includes an image processing section 1, a high speed camera (electronic type camera) 2, a vehicle speed sensor 3, a low speed area calculating unit 4, a high speed image extracting unit 5, a low speed image extracting unit 6, a frame rate calculating unit 7, a frame rate adjusting unit 8, an image output unit 9, an information transmitting unit 10 and an image recognition device 11.

Figure 2:
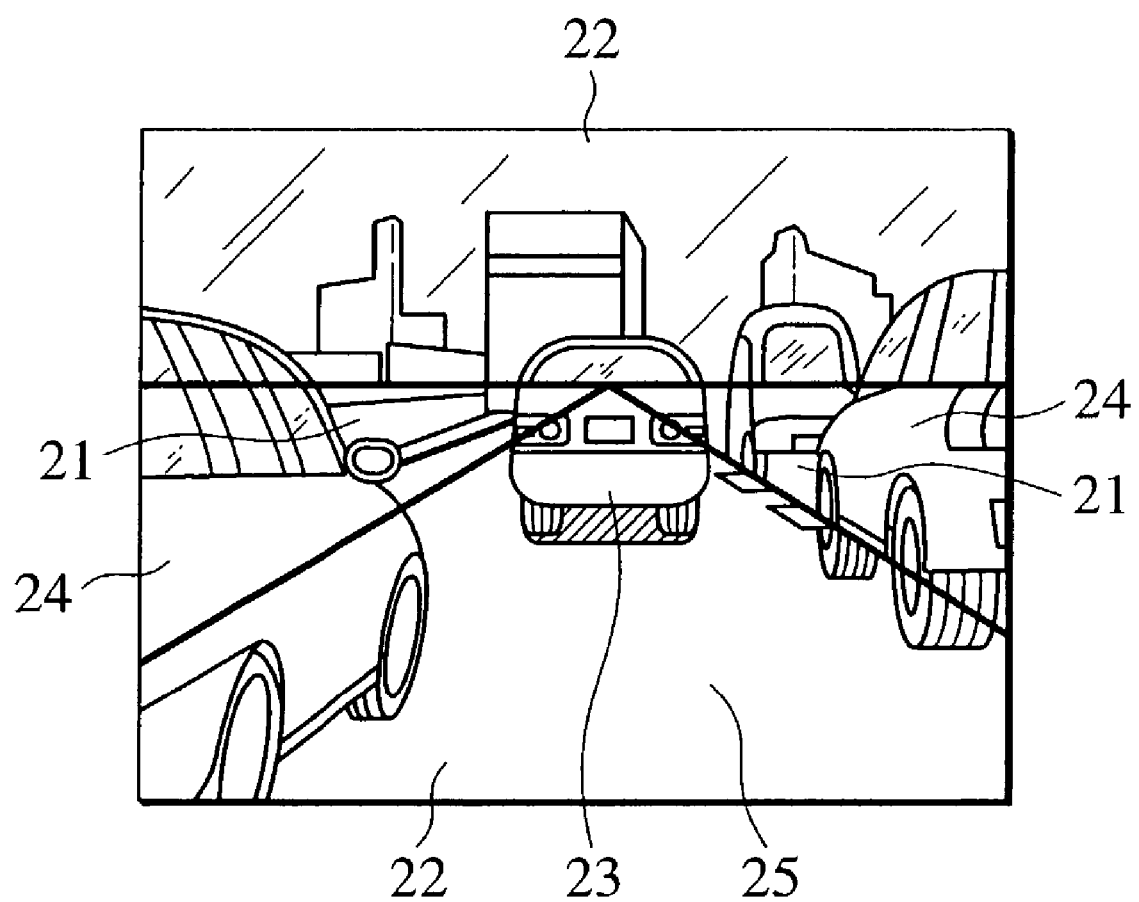
FIG. 2 is a view illustrating an exemplary division pattern with a high frame rate and a low frame rate in the vehicular image processing apparatus of the first embodiment.

FIG. 2 is a view of a display screen illustrating an example in which a display area is divided in a high frame rate and a low frame rate with the vehicular image processing of the presently filed embodiment.

The display screen is shown including a high frame rate area 21, a low frame rate area 22, a preceding vehicle 23, a squeezing vehicle 24 and an own vehicle lane 25.

The high speed camera 2 is mounted on a vehicle so as to pick up an image in front of the vehicle and is comprised of an image pickup element with a large number of pictures to be available per unit time and lens.

The vehicle speed sensor 3 that detects a vehicle speed forms one of a vehicle information detection device and may be replaced with another sensor such as a G-sensor that detects accelerating and decelerating speed.

The low speed area calculating unit 4 calculates an area, of which image information is to be transmitted to the image processing device at a low frame rate, among image data picked up with the high speed camera 12 in response to vehicle information (vehicle speed) obtained from the vehicle speed sensor 3.

The low speed area calculating unit 4 is configured such that when the vehicle travels at a low speed, an entire image pickup area is targeted, whereas when the vehicle travels at a high speed, the low speed area calculating unit transmits information, except for an area where the sqeezing vehicle 24 is picked up, at a low transmission speed. More particularly, the low speed area calculating unit 4 is preset such that the area where the sqeezing vehicle 24 shown in FIG. 2 is picked up is assigned as the high frame rate area 21 and the other area is assigned as the low frame rate area 22 of which information is transmitted at the low transmission speed.

While the first embodiment is described as employing a technology to change over the display condition into two display statuses, in dependence on the vehicle speed, i.e., the high frame rate area 21 and the low frame rate area 22, it may be altered such that the low frame rate area 22 continuously expands (with the high frame rate area 21 being continuously contracted) as the vehicle speed decreases, or the low frame rate area 22 continuously contracts (with the high frame rate area 21 being continuously expanded) as the vehicle speed increases.

The high speed image extracting unit 5 extracts an image of the area other than that of the area of which image information is to be transmitted to the image recognition device 11 at the low frame rate calculated at the low speed area calculating unit 4 and outputs image information of the relevant area image to the image output unit 9 which will be described below.

The low speed image extracting unit 6 extracts an image of the area of which image information is to be transmitted to the image recognition device 11 at the low frame rate calculated at the low speed area calculating unit 4 and outputs image information of the relevant area image to the frame rate adjusting unit 8 which will be described below.

The frame rate calculating unit 7 calculates a frame rate of a low speed image using the vehicle speed signal from the vehicle speed sensor 3 and a calculated result derived from the low speed area calculating unit 4 and outputs a calculated result to the frame rate adjusting unit 8. When this takes place, if the vehicle speed remains at a low level, since a forward traveling road image has less variation, the frame rate of the low speed area can be decreased and, thus, the frame rate calculating unit 7 outputs a further low frame rate. In another alternative, when the vehicle travels on a curved road, since there is a probability in that, even when the vehicle travels at the same vehicle speed as that at which the vehicle travels on a straight road, the amount of lateral movements becomes large with a resultant increase in variation of the image in the forward area, the frame rate calculating unit 7 sets the frame rate at a higher value than that outputted during traveling on the straight road. Although not shown, a situation of the vehicle traveling on the curved road may be detected using a lateral G-sensor, that detects the lateral acceleration, a yaw rate sensor and a steering angle sensor which serve as a vehicle information detection device.

The frame rate adjusting unit 8 outputs the image of the low speed area, which is outputted from the low speed image extracting unit 6 at the high frame rate, to the image output unit 9 at a frame rate calculated with the frame rate calculating unit 7. In a case where the frame rate of the high speed pickup camera 2 is 100 fps (frame/second) and the frame rate calculated with the frame rate calculating unit 7 is 10 fps, then the frame rate adjusting unit 8 outputs image information, by cutting out frames of images on a time basis such that the image is outputted for each 10 frames.

The image output unit 9 synthesizes the high frame rate image outputted from the high speed image extracting unit 5 and the low frame rate image outputted from the frame adjusting unit 8 to provide a synthesized image which is outputted to the information transmitting unit 10.

The information transmitting unit 10 has a communication I/F (interface) function required for permitting image information, outputted from the image outputting unit 9, to be transmitted to the image recognition device 11 serving as the processing section. The information transmitting unit 10 may employ serial communication method that transmits information on a time division basis, a parallel communication method using a plurality of transmission paths and USB, IEEE1394 which are used in personal computers.

The image recognition device 11 executes recognition of an obstruction and recognition of the traveling road on the basis of inputted image information. When executing recognition of the traveling road, it is possible to employ a technology wherein a continuous line segment is extracted from an edge image to detect a white line on the road.

Now, operation and advantages of the image processing apparatus for the vehicle of the first embodiment is described in conjunction with FIG. 2.

An exemplary image, picked up with the pickup image in a case where the present invention is applied to a detection sensor for detecting an obstruction and a road shape from the image of the forward area of the vehicle, is shown in FIG. 2.

During traveling of the vehicle on a road in a traffic jam such as a junction of a high speed road, in a peripheral area of the vehicle there are not only the preceding vehicle 23 but also, as shown in FIG. 2, the sqeezing vehicle 24 that alters a traffic lane adjacent to own traffic lane (a lane on which the own vehicle is traveling) and penetrates just in front of the own vehicle. Such a sqeezing vehicle 24 is accompanied with right and left movements to alter the traffic lane and, in addition, the amount of movements becomes great and a distance between the vehicles is shorter than that between the preceding vehicle 23 and another vehicle in front. In order to detect such a squeezing vehicle 24 to provide proper alerts or to compel the vehicle to be controlled in movement, there is a need for a performance to detect at a high speed in a highly reliable manner. Accordingly, there is a need for the pickup camera with which image information can be obtained at a higher speed to provide an image with a high quality.

In the exemplary case shown in FIG. 2, the picked-up image area is divided into four-divided segments (as at 21, 21, 22, 22), with the frame rate of the area at which the sqeezing vehicle 24 is apt to be detected is increased to assign such area as the high frame rate area 21. Since the other areas have small variations in images and a sufficient amount of information can be obtained even when those areas are picked at the low frame rate, those areas are assigned as the low frame rate areas 22.

Also, since no attempt has been made to a resolution degree of the image and no degradation occur in the quality of the image, even if the image remain in the low frame rate area 22, it is possible to perform the operation in the highly reliable manner.

It is of course that the area may be divided not only in the four-division technique but also may be altered so as to suit a purpose of a system to which the present invention is applied. In a case where an image of a side area of the vehicle is picked up, an upper area of the image is assigned as the low frame rate area while a lower area is assigned as the high frame rate area to permit an obstacle, laying in a position closer to the road surface at which the amount of movement of the vehicle is great, to be picked up in image at the high frame rate to make it possible for detect the obstacle at the high speed.

Further, since the image of the forward area is picked up with only the high speed camera 2, the area of which image information is outputted at the low frame rate compels image information to be cut out on the time basis and to be outputted, it is advantageous for respective images of the high frame rate and the low frame rate to form the images picked up on the same axis for thereby providing an ease of executing the operation needed for correlated information between the high frame rate image and the low frame rate image.

Thus, the image processing apparatus for the vehicle according to the first embodiment features the provision of the image pickup section (the high speed camera 2 shown in FIG. 2) adapted to pick up at least a portion of the image around the circumferential periphery of the vehicle, the processing section (the image recognition device 11) that detects at least a portion of an object to be detected around the circumferential periphery of the vehicle on the basis of the image information picked up with the image pickup section, the output section (the image output unit 9) that outputs the image, picked up with the image pickup section, to the processing section, and the image area dividing unit (the low speed area calculating unit 4, the high speed image extracting unit 5, the low speed image extracting unit 6, the frame rate calculating unit 7 and the frame rate adjusting unit 8) that divides the image area, picked up with the image pickup section, into the area (the high frame rate area 24) to be outputted at the high frame rate, and the area (the low frame rate area 22) to be outputted at the low frame rate (see FIGS. 1 and 2).

It is conceivable that when trying to quickly and precisely detect the squeezing vehicle 24 (see FIG. 2) using the camera, a large number of images can be picked up to allow a slight degree of variation to be detected among the picked up images. However, in order for the large number of images to be transmitted to the controller, the transmission speed must be increased, or there is a need for a bus to allow a large volume of data to be transferred at once. When applying the above-described related art example to the vehicle, the presence of data transfer for each one line suffers from an issue in which the number of picture elements corresponding to the object to be detected is reduced by half with a resultant degradation in detecting precision.

In contrast, the present invention has a capability in that the images are updated at the high frame rate at the area (i.e., in the lateral direction), in the picked up image, where the squeezing vehicle 24 is probable to be detected whereas the images are updated at the low frame rate at the area (i.e., in the vertical direction), in the picked up image, where the squeezing vehicle 24 is hard to be detected for thereby obtaining the same detective precision as that of the high frame rate detection without increasing the volume of data to be transmitted. Also, since the CMOS sensor is able to perform a random access, it is possible to freely access to any address. Accordingly, using the CMOS sensor as the high speed camera 2 enables the access to be executed for only a targeted portion of the area as shown in FIG. 2.

Further, when using a CCD camera, as the high speed camera 2, that sequentially reads out in a line, a low frame line may be cut out without being read out.

Namely, such a structure is enabled to perform a desired purpose in such a way that the images are not proceeded at a single frame rate and the area of the image picked up with the image pickup section is divided into a first area where the images are outputted at the high frame rate and a second area where the images are outputted at the lower frame rate than the above-described high frame rate for thereby providing a capability of treating the images at the high frame rate without causing deterioration in the quality of the images. Further, a low speed processing device can be employed and, in addition, electric power consumption can be minimized, resulting in a capability of structuring a processing device with no need for a high speed communication I/F between the pickup section and the processing device.

Further, the image processing apparatus for the vehicle of the first embodiment concerns a structure that includes a vehicle information detecting device (the vehicle speed sensor 3) for detecting the traveling status of the above-described vehicle, a dividing unit which includes the low speed area calculating unit 4 for calculating the area to be picked up at the low frame rate, the low speed image extracting unit 6 for extracting the image of the area calculated with the above low speed area calculating unit and the high speed image extracting unit 5 for extracting the other image than that of the area calculated with the above low speed area calculating unit, and the output unit including the image outputting unit 9 which synthesizes image information, extracted with the above high speed image extracting unit, and image information outputted from the above low speed image extracting unit, with an output of the image outputting unit being used as an input image of the above-described processing device (the image recognition device 11) (see FIG. 1).

With such a structure, changing over between the image area, to be picked up at the high frame rate, and the image area to be picked up at the low frame rate in dependence on the traveling status of the vehicle allows the area, which needs the high frame rate, to be appropriately selected, enabling the operation required for the high frame rate to be reliably executed. Moreover, a further highly reliable detection can be achieved, with a decrease in a volume of information to be outputted from the pickup unit.

In addition, the vehicular image processing apparatus of the first embodiment further features the provision of the vehicle information detecting device (the vehicle speed sensor 3) for detecting the traveling status of the above-described vehicle, the dividing unit which further includes the low speed area calculating unit 4 for calculating the area to be picked up at the low frame rate, the frame rate calculating unit 7 for calculating the frame rate of the low speed area in dependence on the area calculated with the low speed area calculating unit, the low speed image extracting unit 6 for extracting the image of the area calculated with the above low speed area calculating unit, the high speed image extracting unit 5 for extracting the other image than that of the area calculated with the above low speed area calculating unit, and the frame rate adjusting unit 8 for permitting the image, extracted with the above low speed image extracting unit, to be outputted at the frame rate calculated with the above frame rate calculating unit, the output unit including the image outputting unit 9 which synthesizes image information, extracted with the high speed image extracting unit, and image information outputted from the frame rate adjusting unit such that the output of the image outputting unit is used as the input image of the above-described processing device (the image recognition device 11) (see FIG. 1).

With such a structure, varying the frame rate of the image to be picked up at the low frame rate in dependence on the traveling status of the vehicle enables an optimum frame rate to be appropriately selected, enabling a further reliable detection to be performed while enabling reduction in the volume of information to be outputted from the pickup unit.

In addition, the vehicular image processing apparatus of the first embodiment further features the provision of the imaging device (the high speed camera 2) that picks up the image in front of the vehicle while allocating the areas (the high frame rate areas 21), of which images are picked up at the high frame rate, at the right and left sides whereas the areas (the low frame rate areas 22), of which images are picked up at the low frame rate, are allocated at the central portion of the image (see FIG. 2).

Moreover, the vehicular image processing apparatus of the first embodiment further features the provision of the imaging device (the high speed camera 2) that picks up the image in front of the vehicle while allocating the area (the low frame rate area 22), of which images are picked up at the low frame rate, at the area laying in the own vehicle's lane 25 (see FIG. 2).

Furthermore, the vehicular image processing apparatus of the first embodiment further features the provision of the imaging device (the high speed camera 2) that picks up the image in front of the vehicle while allocating the area (the low frame rate area 22), of which images are picked up at the low frame rate, at the area where the preceding vehicle 23 is detected (see FIG. 2).

With these structures, since a relatively less variation occurs in the images related to the vehicle 23 traveling in the forward area with a low relative speed or the road of which contour continuously varies, even when using the image of the low frame rate, it is possible to perform a highly reliable recognition of the vehicle or to perform a recognition of the road shape. In addition, with the squeezing vehicle 24 that squeezes from the adjacent traffic lane, the relative speed becomes large and, so, a relevant area can be detected at a high speed using images of the relevant area picked up at the high frame rate.

<Second Embodiment>

Figure 3:
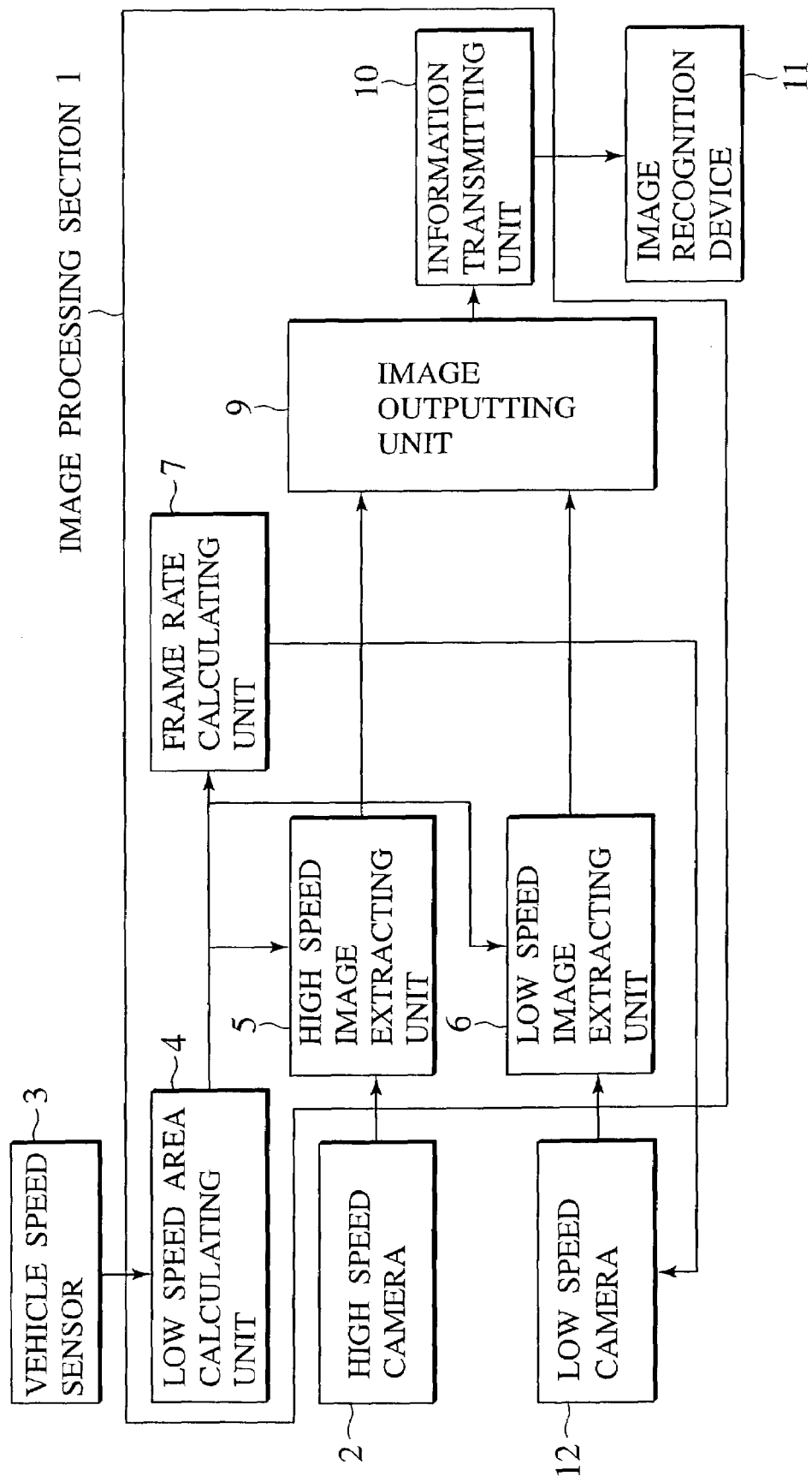
FIG. 3 is a block diagram illustrating a structure of a vehicular image processing apparatus of a second embodiment according to the present invention.

FIG. 3 is a block diagram illustrating a structure of a vehicular image processing apparatus of a second embodiment according to the present invention.

The image processing apparatus includes the image processing section 1, the high speed camera 2 (electronic type camera), a low speed camera 12, the vehicle speed sensor 3, the low speed area calculating unit 4, the high speed image extracting unit 5, the low speed image extracting unit 6, the frame rate calculating unit 7, the image output unit 9, the information transmitting unit 10 and the image recognition device 11.

Here, the second embodiment is described in conjunction with features different from those of the first embodiment set forth above.

Since the second embodiment is provided with two cameras, i.e., the high speed camera 2, that picks up images at the high frame rate, and a low speed camera 12 that picks up images at the low frame rate, the low speed camera 12 outputs images at the low frame rate and, thus, the frame rate adjusting unit 8 (see FIG. 1) forming part of the first embodiment is dispensed with.

Since the high speed camera 2 for the high frame rate and the low speed camera 12 for the low frame rate to pick up images at the high and low frame rates, respectively, an angle at and a direction in which the image is picked up can be discretely determined, enabling the images, suited for the respective frame rates, to be picked up.

Thus, the vehicular image processing apparatus of the second embodiment features the provision of the vehicle information detecting device (the vehicle speed sensor 3) for detecting the traveling status of the vehicle, the dividing unit which further includes the high speed imaging device (the high speed camera 2) for picking up the image around the vehicle at the high frame rate, the low speed area calculating unit 4 for calculating the area to be picked up at the low frame rate based on an output of the vehicle information detecting device, the frame rate calculating unit 7 for calculating the frame rate of the low speed area in dependence on the area calculated with the low speed area calculating unit, a low speed imaging device (the low speed camera 12) for picking up images around a surrounding of the vehicle at a frame rate, lower than that of the high speed imaging device, calculated with the frame rate calculating unit, the low speed image extracting unit 6 for extracting the image of the area, calculated with the low speed area calculating unit, from the images picked up with the low speed imaging device, the high speed image extracting unit 5 for extracting the other image, than that of the area calculated with the low speed area calculating unit, from the images picked up with the high speed imaging device, and the output unit including the image outputting unit 9 which synthesizes image information, extracted with the high speed image extracting unit, and image information outputted from the low speed imaging device, with the output of the image outputting unit being used as the input image of the above-described processing device (the image recognition device 11) (see FIG. 3).

With such a structure, since the high speed image pickup means and the low speed image pickup means are provided to pick up images at the respective frame rates, the angle at and the direction in which the image is picked up can be discretely determined, enabling the images suited for the respective frame rates to be picked up.

The entire content of Japanese Patent Application No. P2002-58402 with a filing date of Mar. 5, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A vehicular image-processing apparatus, comprising:
   an imaging device picking up an image of a surrounding of a vehicle;
   a dividing unit dividing an area of the image picked up with the imaging device into a first image area to be outputted at a low frame rate and a second image area to be outputted at a higher frame rate than the low frame rate;
   an output unit synthesizing image information of the first image area and image information of the second image area; and
   a processing device detecting an object to be detected of the surrounding of the vehicle from the image synthesized with the output unit.

2. The vehicular image processing apparatus according to claim 1, further comprising:
   a vehicle information detecting device detecting a traveling status of the vehicle; and a first image area calculating unit calculating the first image area to be outputted at the low frame rate in dependence on the traveling state of the vehicle detected with the vehicle information detecting device, wherein the dividing unit comprises:

a first image area extracting unit extracting the first image area calculated with the first image area calculating unit from the image picked up with the image device; and a second image extracting unit extracting an image area other than the first image area as a second image area from the image picked up with the image device, wherein the output unit comprises:

an image outputting unit synthesizing the image information of the second image area extracted from the second image area extracting unit and the image information of the first image area extracted from the first image area extracting unit, to provide the synthesized image to the processing device as an input image.

3. The vehicular image processing apparatus according to claim 1, further comprising:

a vehicle information detecting device detecting a traveling status of the vehicle; and a first image area calculating unit calculating the first image area to be outputted at the low frame rate in dependence on the traveling state of the vehicle detected with the vehicle information detecting device, wherein the dividing unit comprises:

a frame rate calculating unit calculating a frame rate of the first image area in dependence on the traveling state of the vehicle detected with the vehicle information detecting device;

a first image area extracting unit extracting the first image area calculated with the first image area calculating unit from the image picked up with the image device;

a second image area extracting unit extracting an image area other than the first image area as the second image area from the image picked up with the image device; and a frame rate adjusting unit outputting the image information of the first image area at the frame rate calculated with the frame rate calculating unit, wherein the output unit comprises:

an image outputting unit synthesizing the image information of the second image area extracted with the second image extracting unit and the image information of the first image area outputted from the frame rate adjusting unit, to provide the synthesized image to the processing device as an input image.

4. The vehicular image processing apparatus according to claim 1, further comprising:

a vehicle information detecting device detecting a traveling status of the vehicle, and wherein the imaging device comprises:

a high speed imaging device picking up an image of the surrounding of the vehicle at a high frame rate; and a low speed imaging device picking up an image of the surrounding of the vehicle at a frame rate lower than the high frame rate of the high speed imaging device, wherein the dividing unit comprises:

a frame rate calculating unit calculating the frame rate of the low speed imaging device in dependence on the traveling state of the vehicle detected with the vehicle information detecting device;

a first image area extracting unit extracting the first image area calculated with the first image area calculating unit from the image picked up with the low speed imaging device; and a second image area extracting unit extracting an image other than the first image area as the second image area from the image picked up with the high speed imaging device; and wherein the output unit comprises:

an image outputting unit synthesizing the image information of the second image area extracted with the second image area extracting unit and the image information of the first image area extracted from the first image extracting unit, to provide the synthesized image to the processing device as an input image.

5. The vehicular image processing apparatus according to claim 1, wherein when the image picked up with the imaging device is an image of a forward area of the vehicle, right and left areas of the image is set up as the second image area outputted at the higher frame rate and a central area of the image outputted at the low frame rate.

6. The vehicular image processing apparatus according to claim 1, wherein when the image picked up with the imaging device is an image of a forward area of the vehicle, an area within a traffic lane of the vehicle of the image is set up as the first image area at the low frame rate.

7. The vehicular image processing apparatus according to claim 1, wherein when the image picked up with the imaging device is an image of a forward area of the vehicle, an area in which a preceding vehicle is detected is set up as the first image area at the low frame rate.

8. A method of processing an image for a vehicle, comprising:

picking up an image of a surrounding of a vehicle;

dividing an area of the picked-up image into a first image area to be outputted at a low frame rate and a second image area to be outputted at a higher frame rate than the low frame rate;

synthesizing image information of the first image area and image information of the second image area; and detecting an object to be detected of the surrounding of the vehicle from the synthesized image.

9. A vehicular image processing apparatus, comprising:

image means for picking up an image a surrounding of a vehicle;

dividing means for dividing an area of the image picked up with the image pickup means into a first image area to be outputted at a low frame rate and a second image area to be outputted at a higher frame rate than the low frame rate;

output means for synthesizing image information of the first image area and image information of the second image area; and processing means for detecting an object to be detected of the surrounding of the vehicle from the image synthesized with the output means.

* * * * *